United States Patent
Kim et al.

(10) Patent No.: US 7,450,853 B2
(45) Date of Patent: Nov. 11, 2008

(54) SIGNAL TRANSMISSION APPARATUS AND METHOD FOR OPTICAL BASE STATION

(75) Inventors: Woo Sik Kim, Seoul (KR); Yoeng Ki Kim, Kyungki-Do (KR)

(73) Assignee: LG Nortel Co., Ltd., Seoul (KR)

( * ) Notice: Subject to any disclaimer, the term of this patent is extended or adjusted under 35 U.S.C. 154(b) by 1411 days.

(21) Appl. No.: 10/023,745

(22) Filed: Dec. 21, 2001

(65) Prior Publication Data

US 2002/0080448 A1    Jun. 27, 2002

(30) Foreign Application Priority Data

Dec. 22, 2000 (KR) .............................. 2000-79995

(51) Int. Cl.
*H04B 10/00* (2006.01)

(52) U.S. Cl. ..................................... 398/115; 398/67

(58) Field of Classification Search ................. 398/115, 398/116, 117, 66, 67
See application file for complete search history.

(56) References Cited

U.S. PATENT DOCUMENTS 5,067,173 A * 11/1991 Gordon et al. .............. 398/116
5,627,879 A *  5/1997 Russell et al. .............. 370/328

* cited by examiner

*Primary Examiner*—Christina Y Leung
(74) *Attorney, Agent, or Firm*—KED & Associates, LLP

(57) ABSTRACT

A signal transmitting apparatus for an optical base station is disclosed. According to the invention, a base station outputs a digital IQ signal to an optical connecting unit. The optical connecting unit processes the digital IQ signal digitally, and transmits the digital signal over an optical network to a remotely located optical base station. The remote station digitally processes the signal before converting to an RF signal for transmission. The invention advantageously decreases signal loss and noise associated with analog processing in the optical connecting units and remote stations in the related art. System reliability is also improved.

9 Claims, 6 Drawing Sheets

SIGNAL TRANSMISSION APPARATUS AND METHOD FOR OPTICAL BASE STATION

BACKGROUND OF THE INVENTION

1. Field of the Invention

The present invention relates to a base station for communications, and more particularly, to a base station using optical communications.

2. Background of the Related Art

FIG. 1 is a conceptual view of a general optical base station. As shown therein, a mobile communication base station 10 transmits a radio signal with sufficient power to reach to every terminal within a service area. However, in view of the characteristics of the radio wave, shadow areas may exist, causing a failure to communicate with a terminal. Shadow areas may be the result of a skyscraper, a rear side of hill areas, or an underground living area. In addition, if a new skyscraper is built, a new shadow area is generated.

In order to provide the shadow area with a communication service, a communication service provider should establish a new base station or operate a small-sized remote base station 100 using the same frequency, data signal, and control signal as those of a pertinent base station. In most cases, in order to effectively operate within a limited frequency spectrum, the remote station 100 is installed. The remote base station 100 is also called an optical base station.

FIG. 2 is a schematic view showing the construction of a signal transmitting apparatus for an optical base station in accordance with the related art. As shown in FIG. 2, the related art signal transmitting apparatus for an optical base station includes a base station 10 controlling a plurality of optical base stations 100 or transmitting and receiving a radio frequency (RF) signal to and from the plurality of optical base stations 100 through an optical connecting unit 70. The optical connecting unit 70 converts the RF signal outputted from the base station 10 into an optical signal and outputs the optical signal through an optical cable 90 to the plurality of optical base stations 100. Additionally, optical connecting unit 70 converts optical signals received through the optical cable 90 into an RF signal and transmits the RF signal to the base station 10. The remote station 100 converts the optical signal received through the optical cable 90 from the optical connecting unit 70 into a high power RF signal used in a mobile communication system and transmits the high power RF signal to an antenna. The remote station 100 down/up-converts the RF signal received by the antenna, converts the converted signal into an optical signal, and outputs to the optical signal optical cable 90.

FIG. 4 is a view showing the construction of the signal transmission apparatus for an optical base station of FIG. 2. Referring to FIG. 4, the optical connecting unit 70 includes a divider 20 receiving the RF signal from the base station IO and dividing it to a plurality of base station connecting units 80. Optical connecting unit 70 also includes a plurality of base station connecting units 80 adjusting a voltage level of a signal outputted from the divider 20, converting the adjusted signal into an optical signal, and transmitting the optical signal through the optical cable 90 to the plurality of optical base stations 100. Each of the base station connecting units 80 also convert the optical signal received through the optical cable 90 to an RF signal, adjust a voltage level of the converted signal, and output it. Optical connecting unit 70 also includes a combiner 60 combining the output signals of each base station connecting unit 80 and outputting it through a single path to base station 10.

The base station connecting unit 80 includes a transmission signal level controller 30 adjusting a voltage level of the signal outputted from the divider 20. Base station connecting unit 80 also includes an optical transceiver 40 converting the output signal of the transmission signal level controller 30 into an optical signal and outputting the optical signal to the optical cable 90, or converting the optical signal received through the optical cable 90 into an RF signal. Base station connecting unit 80 also includes a reception signal level controller 50 adjusting a voltage level of the signal outputted from the optical transceiver 40 and outputting it to the combiner 60.

The optical connecting unit 70 includes a plurality of base station connecting units 80 equal to the number of remote stations 100.

The remote station 100 includes an optical transceiver 120 converting an optical signal received through the optical cable 90 into an RF signal, or converting the RF signal outputted from an down/up converter 170 into an optical signal and outputting the optical signal to the optical cable 90. Remote station 100 also includes an up-converter 130 up-converting the output signal of the optical transceiver 120 into an RF signal used in a mobile communication system and a high power amplifier (HPA) 140 amplifying the RF signal outputted from the up-converter 130 into a high power signal. Remote station 100 also includes a duplexer 150 filtering the output signal of the HPA 140 and outputting it to an antenna 110, or outputting a signal collected by the antenna 110 to a low noise amplifier (LNA) 160, which amplifies the output signal of the duplexer 150. An down/up converter 170 is also provided for down-converting the output signal of the LNA 160, SAW-filtering the down-converted signal, and up-converting it. The operation of the down/up converter 170 is a process for reducing an influence of a different mobile communication service signal.

In a transmission process of the above-described related art signal transmitting apparatus, the RF signal outputted from the base station 10 is divided to multiple optical base stations 100 by the divider 20 and outputted to each remote station 100 connects to base station connecting unit 80. The transmission signal level controller 30 of each base station connecting unit 80 adjusts the output signal of the divider 20 to a suitable voltage level and then applies it to the optical transceiver 40. The optical transceiver 40 converts the applied signal into an optical signal and outputs the optical signal to the optical cable 90 connected to the plurality of remote stations 100.

Upon receiving the optical signal through the optical cable 90, the optical transceiver 120 of the remote station 100 converts the optical signal into a RF signal. The signal outputted from the optical transceiver 120 passes to the up-converter 130, the high power amplifier 140 and the duplexer 150, and then is transmitted through the antenna 110 to a corresponding terminal.

The operation of the reception signal transmitting apparatus for an optical base station will now be described in detail with reference to FIG. 4. The RF signal outputted from the base station 10 is transmitted to the divider 20 of the optical connecting unit 70, and the divider 20 divides the RF signal into a plurality of base station connecting units 80. The transmission signal level controller 30 of each base station connecting unit 80 adjusts the divided RF signal to a suitable level and transmits it to the optical transceiver 40. The optical transceiver 40 converts the received RF signal into an optical signal and transmits the optical signal through the optical cable 90 to a pertinent remote station 100.

The optical transceiver 120 of each remote station 100 converts the optical signal received through the optical cable 90 into an RF signal and outputs the RF signal to the up-converter 130. The up-converter 130 up-converts the received signal into an RF signal for use in a mobile communication system and outputs it to the HPA 140. The HPA 140 amplifies the inputted signal to a high power signal and transmits the high power signal through the duplexer 150 to the antenna 110.

A signal collected by the antenna 110 is applied to the LNA 160 by the duplexer 150, and the LNA 160 amplifies the applied signal and transmits it to the down/up converter 170. The down/up converter 170 down-converts the inputted signal, then up-converts the down-converted signal by performing a SAW-filtering thereon, and outputs a resulting signal to the optical transceiver 120. The optical transceiver 120 converts the output signal of the down/up converter 170 into an optical signal and transmits the optical signal through the optical cable 90 to the base station connecting unit 80 of the optical connecting unit 70. The optical connecting unit 70 includes one base station connecting unit 80 for each remote station 100.

The optical transceiver 40 of the base station connecting unit 80 restores the optical signal received through the optical cable 90 to an RF signal. Reception signal level controller 50 adjusts the restored RF signal to a suitable voltage level and outputs it to the combiner 60. The combiner 60 combines the output signals of each base station connecting unit 80 and transmits it to the base station 10.

FIG. 3 is a drawing illustrating a signal transmitting apparatus for an optical base station adopting an E2DM method in accordance with a different related art. As shown therein, when an RF signal outputted from the base station 10 is transmitted to the optical connecting unit 75, a transmission signal level controller 35 of the optical connecting unit 75 adjusts a voltage level of the received RF signal and outputs it to an optical transceiver 180. Then, the optical transceiver 180 converts the inputted RF signal into an optical signal and applies the optical signal to an optical distribution unit 190. The optical distribution unit 190 distributes the applied RF signal to a plurality of remote stations 105 through the optical cable 90.

The optical transceiver 200 of the remote station 105 converts the distributed optical signal into an RF signal and outputs the RF signal to a transmission signal level controller 230, and the transmission signal level controller 230 adjusts the inputted signal to a suitable voltage level and applies it to an HPA 140. The signal applied to the HPA 140 is amplified to a high power signal and transmitted through a duplexer 150 and an antenna 112 to a terminal.

Meanwhile, a radio signal of the terminal is collected by the antennas 112 and 114, and the collected signal is transmitted to the base station 10 though two paths performing a receiving process. The antennas 112 and 114 are diversity antennas for preventing a fading phenomenon of a received signal, and are separately disposed to maintain an optimum distance there between in consideration of a wave length. The RF signal collected by the antennas 112 and 114 is outputted to each LNA 160 and 160' by duplexers 150 and 150', amplified by the LNAs 160 and 160', and transmitted to notch filters 210 and 210'. The notch filters 210 and 210' removes a noise of a certain band from the received signal and outputs the signal without a noise to reception signal level controllers 220 and 220'. The reception signal level controllers 220 and 220' adjust a voltage level of the inputted signal and apply it to the optical transceiver 200. The optical transceiver 200 converts the applied signals of the two paths into an optical signal and outputs it to the optical cable 90.

The signal outputted to the optical cable 90 is transmitted to the optical distributor 190 of the optical connecting unit 75. The optical distributor 190 combines the optical signals outputted from the plurality of remote stations 105 and applies the combined signal to the optical transceiver 180. The optical transceiver 180 converts the applied optical signal into an RF signal and divides it into two paths for outputting. The signal outputted from the optical transceiver 180 is inputted into the reception signal level controllers 55 and 55', adjusted to have a suitable voltage level, and transmitted to the base station 10.

The above-described related art signal transmitting apparatus for a remote station can be used with a 3 wave division multiplexing (3WDM) method. Unlike the signal transmitting apparatus for an optical base station of the related art in which the optical connecting unit 70 includes the plurality of base station connecting units 80, the 3WDM method operates an optical connecting unit 75 with only one optical distribution unit 190 and uses a diversity antenna.

As noted, in the above two embodiments, the optical connecting unit 70 and the remote stations 100 and 105 are based on an analog interface for processing the RF signal.

The related art signal transmitting apparatus for an optical base station has many problems and disadvantages. For example, in the apparatus of FIGS. 2 and 4, as the RF analog signal is converted into an optical signal and is passed through the optical transceivers 40 and 120, the reception performance is degraded and the level of a noise signal is heightened. In order to solve the problem, the gain characteristic of the LNA 160 can be improved, but in view of the input limitation characteristic of the optical transceivers 120 and 40, any improvement will be marginal. Likewise, the apparatus of FIG. 3 solves the problem of fading by receiving a signal of a terminal in the diversity method, but it fails to solve the problem that the reception signal is degraded as a consequence of analog signal processing.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a digital signal interface-based signal transmitting apparatus and method for an optical base station.

Another object of the invention is to reduce the level of a noise signal in an optical communication system.

In order to achieve at least the above objects in while or in part, and in accordance with the purposes of the invention, as embodied and broadly described, there is provided a communications system, including a base station configured to output a first digital in phase and quadrature phase (I/Q) signal, an optical connecting unit configured to convert the first digital I/Q signal into an optical signal and output the converted optical signal through an optical cable, and an optical base station coupled to receive the optical signal through the optical cable and configured to convert the optical signal into a second digital I/Q signal, and convert the second digital I/Q signal into a first RF signal for transmission.

To further achieve at least these advantages in whole or in parts, and in accordance with the purposes of the invention, there is provided a signal transmitting method for a communications system, including converting a first digital I/Q signal outputted from a base station into an optical signal, transmitting the optical signal through an optical cable to an optical base station, converting the optical signal received through the optical cable into a second digital I/Q signal, converting the second digital I/Q signal into a RF signal, and transmitting the RF signal through an antenna.

To further achieve at least these advantages in whole or in parts, and in accordance with the purposes of the invention, there is provided a signal receiving method for a communications system, including receiving an RF signal through an antenna of a first station, converting the received RF signal to a first digital electronic signal, converting the first digital electronic signal to a digital optical signal, transmitting the digital optical signal over an optical link to an optical connecting unit, converting the digital optical signal to a second digital electronic signal in the optical coupling unit, and providing the second digital electronic signal from the optical coupling unit to a second station.

To further achieve at least these advantages in whole or in parts, and in accordance with the purposes of the invention, there is provided a communications system, including means for converting a first digital electronic signal outputted from a first station into a first digital optical signal, means for transmitting the first digital optical signal to a second station, means for converting the first digital optical signal to a second digital electronic signal, means for converting the second digital electronic signal to a first RF signal, and means for transmitting the first RF signal.

To further achieve at least these advantages in whole or in parts, and in accordance with the purposes of the invention, there is provided a signal transmitting method in a communication system, including converting a digital I/Q signal to an optical signal in an optical connecting unit, transferring the optical signal over an optical cable to a remote station, and converting the optical signal into an RF signal for transmission.

To further achieve at least these advantages in whole or in parts, and in accordance with the purposes of the invention, there is provided a communication system, including an optical connecting unit, configured to receive a first digital I/Q signal and convert the first digital I/Q signal into a first digital optical signal, and a remote base station, coupled to receive the first digital optical signal and configured to convert the first digital optical signal to a first analog RF signal for transmission.

To further achieve at least these advantages in whole or in parts, and in accordance with the purposes of the invention, there is provided a communication system, including an optical connection unit, configured to convert a first digital I/Q signal to a first optical signal and to convert a second optical signal to a second digital I/Q signal, and a remote base station, coupled to receive the first optical signal, and configured to convert the first optical signal to a third digital I/Q signal, convert the third digital I/Q signal to a first RF signal, transmit the first RF signal, receive a second RF signal, convert the second RF signal to a fourth digital I/Q signal, and convert the fourth digital I/Q signal to the second optical signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
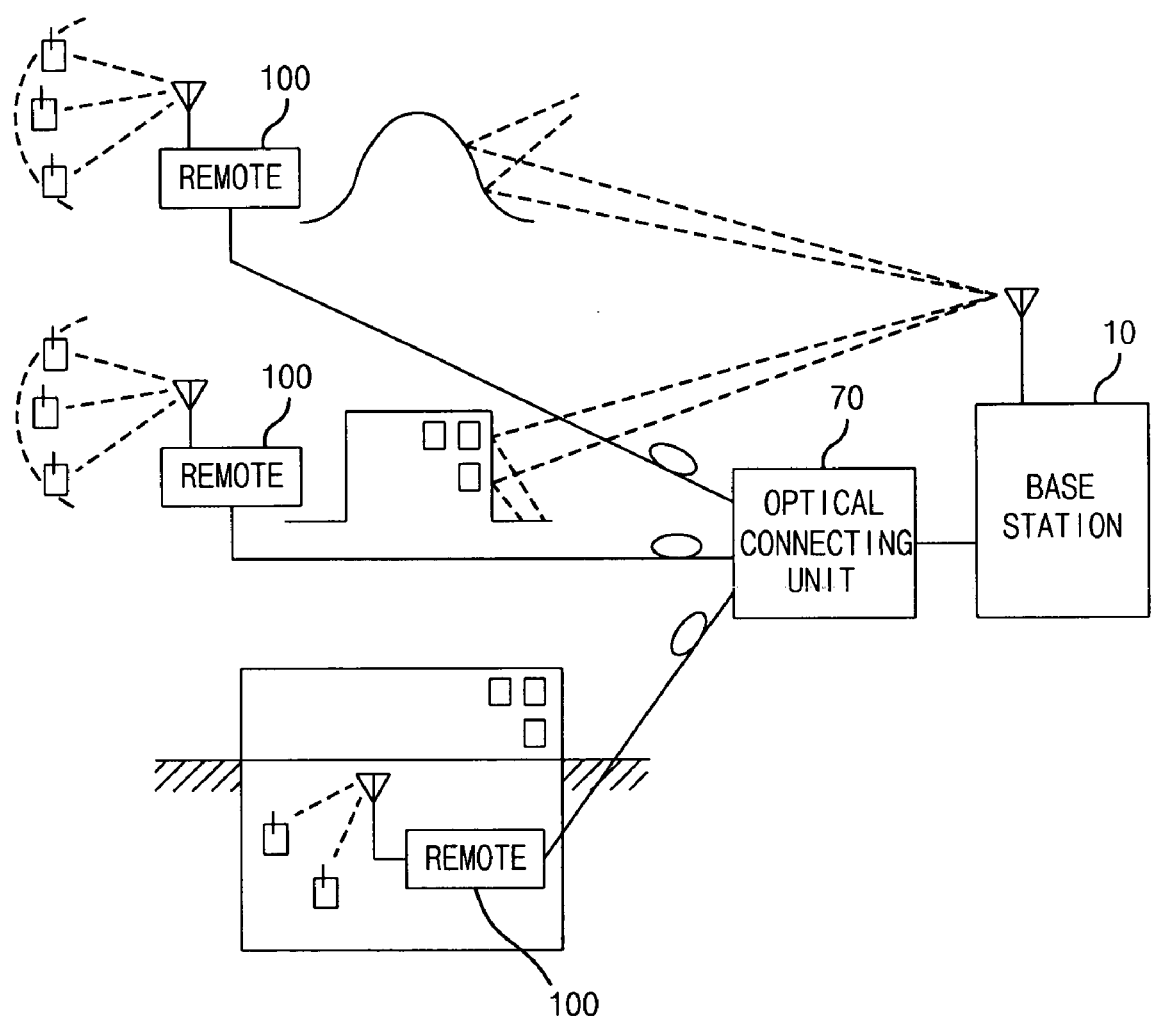
FIG. 1 is a drawing illustrating a concept of a general optical base station.
Figure 2:
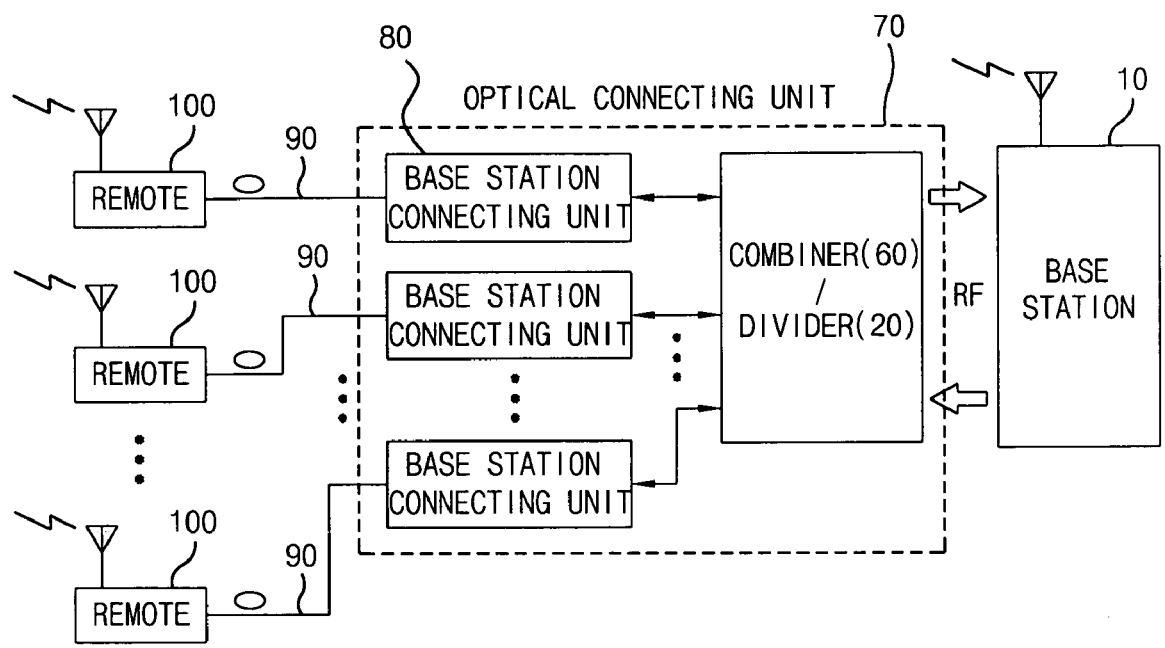
FIG. 2 is a drawing illustrating a schematic construction of a signal transmitting apparatus for an optical base station in accordance with the related art.
Figure 3:
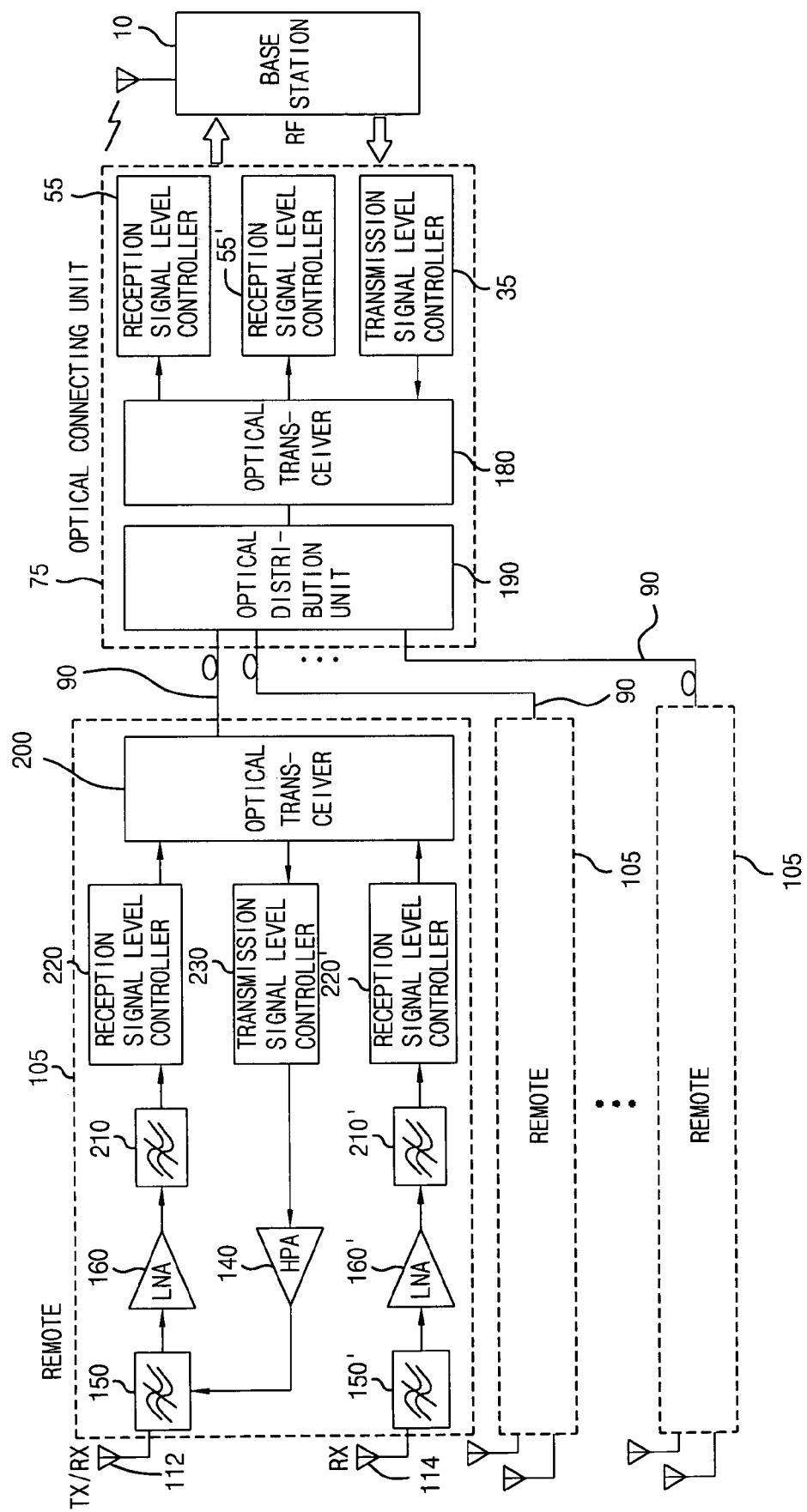
FIG. 3 is a drawing illustrating the construction of the signal transmitting apparatus for an optical base station adopting a 3 wave division multiplexing (3WDM) method in accordance with the related art.
Figure 4:
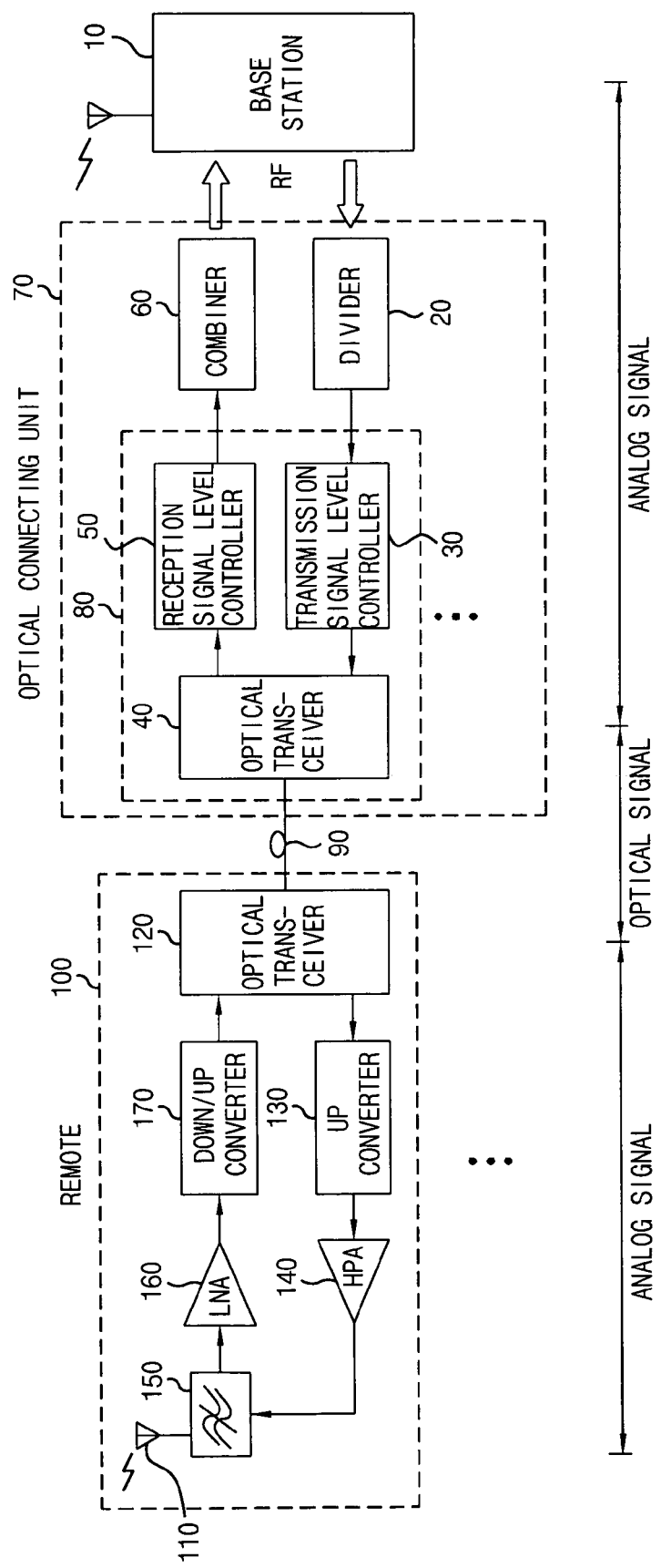
FIG. 4 is a drawing illustrating a detailed construction of signal transmitting apparatus for an optical base station of FIG. 2 in accordance with the related art.
Figure 5:
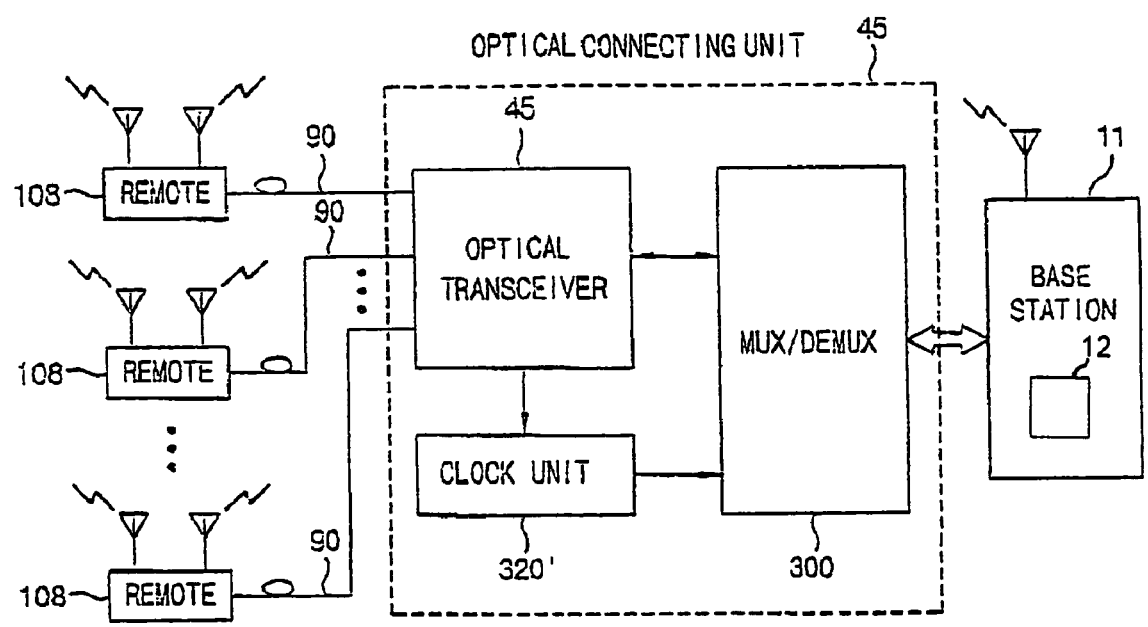
FIG. 5 is a drawing illustrating a signal transmitting apparatus for an optical base station in accordance with a preferred embodiment of the present invention.
Figure 6:
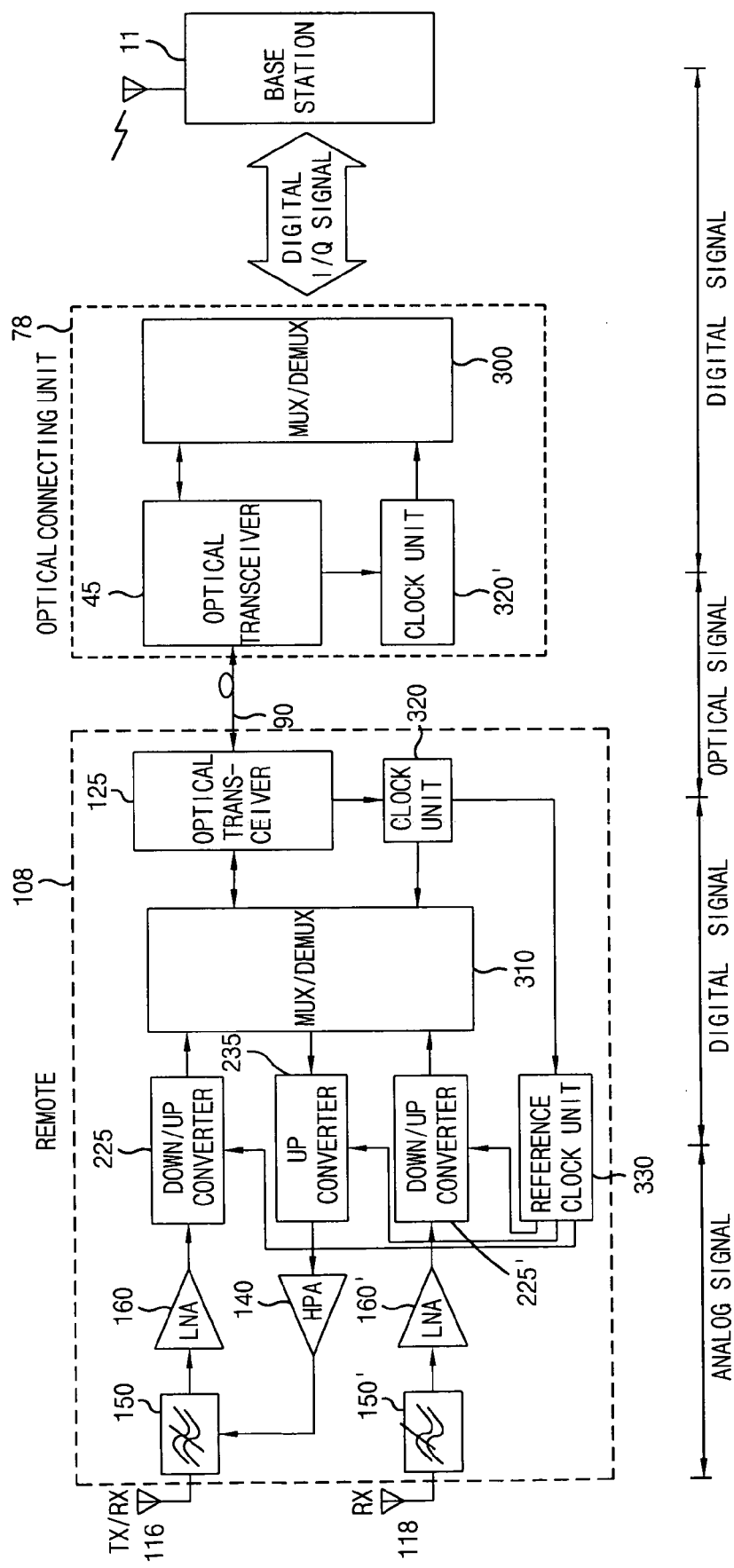
FIG. 6 is a drawing illustrating in detail a signal transmitting apparatus for an optical base station in accordance with the preferred embodiment of the present invention.

FIG. 5 is a drawing illustrating a signal transmitting apparatus for an optical base station in accordance with a preferred embodiment of the present invention, and FIG. 6 is a drawing illustrating additional details of a signal transmitting apparatus for the optical base station of FIG. 5.

As shown in FIGS. 5 and 6, a signal transmitting apparatus for an optical base station of the present invention preferably includes a base station 11 to output a digital I/Q signal and an optical connecting unit 78 to convert the digital in-phase/quadrature phase (I/Q) signal outputted from the base station 10 into an optical signal and outputting the optical signal through an optical cable 90. The system preferably may also include a remote station 108 converting the optical signal received through the optical cable 90 into a digital I/Q signal, converting the converted digital I/Q signal into a high power RF signal, and transmitting the high power RF signal to an antenna 116.

The remote station 108 preferably includes an optical transceiver 125 converting the optical signal received through the optical cable 90 into a digital I/Q signal, a multiplexer/demultiplexer unit 310 demultiplexing the digital I/Q signal outputted from the optical transceiver 125, and an up-converter unit 235 digital/analog-converting the output signal of the multiplexer/demultiplexer unit 310, up-converting it, band-pass filtering it, and outputting an RF signal. Remote station 108 also preferably includes an HPA 140 high-power amplifying the output signal of the up-converter unit 235 and outputting it, a duplexer 150 filtering the output signal of the HPA 140 and outputting it to an antenna 116, a clock unit 320 providing an synchronous signal to the multiplexer/demultiplexer unit 310, and a reference clock unit 330 providing a synchronous signal of the clock unit 320 to the up-converter unit 235 and a plurality of down-converter units 225 and 225'.

The remote station 108 preferably includes a plurality of duplexers 150 and 150' respectively removing a noise component of a signal collected by a plurality of antennas 116 and 118, a plurality of LNAs 160 and 160' amplifying the RF signals outputted from the plurality of duplexers 150 and 150', and a plurality of down-converter units 225 and 225' band-pass filtering the RF signals outputted from the plurality of LNAs 160 and 160', down-converting them, analog/digital converting them, and applying them to the multiplexer/demultiplexer unit 310.

The optical connecting unit 78 preferably includes a multiplexer/demultiplexer unit 300 multiplexing the digital I/Q signal outputted from the base station 11 and outputting it an optical transceiver 45 converting the output signal of the multiplexer/demultiplexer unit 300 into an optical signal and transmitting the optical signal through the optical cable 90 to the plurality of remote stations 108 and a clock unit 320' providing a synchronous signal to the multiplexer/demultiplexer unit 300.

The operation of the signal transmitting apparatus for an optical base station according the preferred embodiment will now be described with reference to the FIG. 6. Unlike the related art signal transmitting apparatus for an optical base station which is based on an RF-signal (i.e. an analog signal) interface, the signal transmitting apparatus for an optical base station of the present invention is based on an I/Q signal (a digital signal) interface.

The base station 11 of the present invention preferably outputs a plurality of digital channel signals. That is, signals transmitted between the base station 11 and the optical connecting unit 78 are digital I/Q signals. Digital I/Q signals outputted from a plurality of channel cards 12 of the base station 11 are preferably transmitted to the multiplexer/demultiplexer unit 300 of the optical connecting unit 78. The multiplexer/demultiplexer unit 300 preferably converts the plurality of received digital I/Q signals from parallel to serial, multiplexes them, and outputs a digital serial signal. Then, the multiplexer/demultiplexer unit 300 preferably transmits the digital serial signal to the optical transceiver 45.

The optical transceiver 45 preferably converts the received digital serial signal to an optical signal. The converted optical signal is preferably transmitted through the optical cable 90 to the plurality of remote stations 108. The optical transceiver 125 of the remote station 108 preferably converts the optical signal received through the optical cable 90 into a digital serial signal, an electric signal, and outputs the converted signal to the multiplexer/demultiplexer unit 310.

The multiplexer/demultiplexer unit 310 preferably converts the received digital serial signal from serial to parallel, demultiplexer it and outputs it to the up-converter unit 235. The multiplexer/demultiplexer unit 310 then preferably performs demultiplexing in synchronization with a clock signal of the clock unit 320.

The multiplexer/demultiplexer unit 310 preferably converts the received digital serial signal from serial to parallel, demultiplexes it and outputs it to the up-converter unit 235. The multiplexer/demultiplexer unit 310 then preferably performs demultiplexing in synchronization with a clock signal of the clock unit 320.

The HPA 140 preferably amplifies the inputted RF signal to a high power signal. The amplified RF signal is preferably transmitted to the duplexer 150 and transmitted through the antenna 116.

Since the remote station 108 preferably employs a diversity receiving method, it preferably includes a dual purpose antenna 116 for transmission and reception, and a reception dedicated antenna 118. The two antennas 116 and 118 preferably are isolated to maintain an optimum distance there between in consideration of a wave length. The first antenna 116 and the second antenna 118 respectively preferably apply the received RF signal to the duplexers 150 and 150'. The RF signals applied to the duplexers 150 and 150' are preferably amplified by the LNAs 160 and 160' and outputted to the down-converter units 225 and 225'.

The down-converter units 225 and 225' preferably bandpass filter the inputted RF signal, down-convert, analog/digital convert and generate a digital I/Q signal. Then the down-converter units 225 and 225' preferably output the generated digital I/Q signal to the multiplexer/demultiplexer unit 310. The down-converter units 225 and 225' preferably perform a down-converting operation in synchronization with the clock signal outputted from the reference clock unit 330. The reference clock unit 330 preferably receives the clock signal from the clock unit 320.

The multiplexer/demultiplexer unit 310 preferably converts the inputted digital I/Q signals of the two paths from parallel to serial, multiplexes it and outputs a digital serial signal. Then, the multiplexer/demultiplexer unit 310 preferably transmits the outputted digital serial signal to the optical transceiver 125.

The optical transceiver 125 preferably converts the received digital serial signal into an optical signal. The converted optical signal is preferably transmitted through the optical cable 90 to the optical connecting unit 78.

The optical transceiver 45 of the optical connecting unit 78 preferably restores the optical signal received through the optical cable 90 to a digital serial signal, an electric signal, and outputs the restored signal to the multiplexer/demultiplexer unit 300.

The multiplexer/demultiplexer 300 preferably converts the inputted I/Q signal from serial to parallel, demultiplexer it and outputs a digital I/Q signal. Then, the multiplexer/demultiplexer unit 300 preferably performs the demultiplexing in synchronization with the clock signal of the clock unit 320. The clock signal has been generated in the base station, and the clock units 320 and 320' receive through the optical transceiver. The outputted digital I/Q signal is preferably transmitted to the base station 11.

The preferred embodiment of the invention has many advantages compared to the related art signal transmitting apparatus. For example, optical base station of the present invention can avoid signal degradation in analog stages of the base station, since the digital I/Q signal of the base station 10 is directly transmitted to the optical connecting unit 78. Also, the digital interface-based apparatus of the present invention improves the noise figure by virtue of a noise floor which occurs in the analog interface-based apparatus of the related art.

In addition, since the up-converter unit 235 and the plurality of down-converter units 225 and 225' are preferably components of remote station 108 in the present invention, the base station 11 can be constructed with only a channel bank.

Moreover, since the optical signal transmitted between the base station 11 and the remote station 108 is a digital I/Q signal, the performance degradation due to the optical transceivers 45 and 125 can be considerably reduced. Also, since the digital signal can be easily restored in the event of an error, the reliability of the system can be improved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A communications system, comprising:
a base station configured to output first digital in phase and quadrature phase (I/Q) signals;
an optical connecting unit configured to convert the first digital I/Q signals into optical signals and output the converted optical signals through an optical cable; and
an optical base station coupled to receive the optical signals through the optical cable and configured to convert the optical signals into second digital I/Q signals, and convert the second digital I/Q signals into first RF signals for transmission,
wherein the optical base station comprises:
an optical transceiver configured to convert the optical signals received through the optical cable into the second digital I/Q signals;
a multiplexer/demultiplexer unit configured to demultiplex the second digital I/Q signals outputted from the optical transceiver;
an up-converter configured to convert and filter output signals of the multiplexer/demultiplexer unit and output the first RF signals;
a High Power Amplifier (HPA) configured to amplify the first RF signals outputted by the up-converter; and
a duplexer configured to filter the amplifier first RF signals and provide the filtered output to an antenna,
wherein the optical base station further comprises:
a plurality of duplexers configured to remove a noise component of second RF signals collected by a corresponding plurality of antennas;
a plurality of Low Noise Amplifiers (LNAs) configured to amplify the second RF signals outputted from the plurality of duplexers; and
a plurality of down-converter units configured to band-pass filter, down-convert and analog to digital convert, the second RF signals outputted from the plurality of LNAs.

2. The system of claim 1, wherein the optical base station further comprises a clock unit configured to provide a synchronous signal to the multiplexer/demultiplexer unit.

3. The system of claim 2, wherein the optical base station further comprises a reference clock unit configured to provide the synchronous signal of the clock unit to the up-converter unit and the plurality of down-converter units.

4. A communications system comprising:
a base station configured to output first digital in phase and quadrature phase (I/Q) signals;
an optical connecting unit configured to convert the first digital I/Q signals into optical signals and output the converted optical signals through an optical cable; and
an optical base station coupled to receive the optical signals through the optical cable and configured to convert the optical signals into second digital I/Q signals, and convert the second digital I/Q signals into first RF signals for transmission,
wherein the optical connecting unit comprises:
a multiplexer/demultiplexer configured to multiplex the first digital I/Q signals;
an optical transceiver configured to convert output signals of the multiplexer/demultiplexer into the optical signals and transmit the optical signals through the optical cable to the optical base station; and
a clock unit configured to provide a synchronous signal to the multiplexer/demultiplexer unit.

5. The system of claim 4, wherein the optical transceiver is further configured to receive optical signals from the optical base station and convert the received optical signals into third digital I/Q signals to be transmitted to the base station.

6. The system of claim 4, wherein the multiplexer/demultiplexer converts the first digital I/Q signals from parallel to serial.

7. A signal transmitting method for a communications system, comprising:
converting first digital I/Q signals outputted from a base station into optical signals;
transmitting the optical signals through an optical cable to an optical base station;
converting the optical signals received through the optical cable into second digital I/Q signals;
converting the second digital I/Q signals into RF signals; and
transmitting the RF signals through an antenna,
wherein converting the first digital I/Q signals to the optical signals comprises multiplexing the first digital I/Q signals.

8. The method of claim 7, wherein multiplexing is performed in accordance with a synchronous signal.

9. A signal transmitting method in a communication system, comprising:
receiving digital I/Q signals from a base station;
converting the digital I/Q signals to optical signals in an optical connecting unit;
transferring the optical signals over an optical cable to a remote station; and
converting the optical signals into RF signals for transmission,
wherein converting the digital I/Q signals comprises multiplexing the digital I/Q signals and inputting the multiplexed digital I/Q signals into an optical transceiver to generate the optical signals.

* * * * *